US012131749B2

(12) United States Patent
De Vries et al.

(10) Patent No.: US 12,131,749 B2
(45) Date of Patent: Oct. 29, 2024

(54) METHOD OF DETECTING SPEECH AND SPEECH DETECTOR FOR LOW SIGNAL-TO-NOISE RATIOS

(71) Applicant: GN Hearing A/S, Ballerup (DK)

(72) Inventors: Rob Anton Jurjen De Vries, Eindhoven (NL); Tobias Piechowiak, Hedehusene (DK)

(73) Assignee: GN Hearing A/S, Ballerup (DK)

(*) Notice: Subject to any disclaimer, the term of this patent is extended or adjusted under 35 U.S.C. 154(b) by 221 days.

(21) Appl. No.: 17/828,777

(22) Filed: May 31, 2022

(65) Prior Publication Data

US 2022/0293127 A1 Sep. 15, 2022

Related U.S. Application Data

(63) Continuation of application No. PCT/EP2021/052676, filed on Feb. 4, 2021.

(30) Foreign Application Priority Data

Feb. 4, 2020 (EP) .................................... 20155485

(51) Int. Cl.

| | |
|---|---|
| ***G10L 25/78*** | (2013.01) |
| ***G10L 21/0232*** | (2013.01) |
| ***G10L 25/93*** | (2013.01) |
| ***H04R 3/04*** | (2006.01) |

(52) U.S. Cl.

CPC .......... *G10L 25/78* (2013.01); *G10L 21/0232* (2013.01); *G10L 25/93* (2013.01); *H04R 3/04* (2013.01); *G10L 2025/937* (2013.01)

(58) Field of Classification Search

CPC ...... G10L 25/78; G10L 21/0232; G10L 25/93

See application file for complete search history.

(56) References Cited

U.S. PATENT DOCUMENTS

| | | | | |
|---|---|---|---|---|
| 9,191,753 | B2 | 11/2015 | Meincke et al. | |
| 9,215,527 | B1 * | 12/2015 | Saric ...................... | H04R 3/005 |
| 2006/0053007 | A1 | 3/2006 | Niemisto | |
| 2013/0322215 | A1 * | 12/2013 | Du .......................... | G10L 25/78 367/136 |
| 2015/0245129 | A1 | 8/2015 | Dusan et al. | |
| 2017/0110145 | A1 | 4/2017 | Gao | |

OTHER PUBLICATIONS

PCT Written Opinion for International Appln. No. PCT/EP2021/052676 dated Aug. 12, 2021.

* cited by examiner

*Primary Examiner* — Bryan S Blankenagel

(74) *Attorney, Agent, or Firm* — Vista IP Law Group, LLP

(57) ABSTRACT

The present disclosure relates in a first aspect to a method of detecting speech of incoming sound at a portable communication device. A microphone signal is divided into a plurality of separate frequency band signals from which respective power envelope signals are derived. Onsets of voiced speech of a first frequency band signal are determined based on a first stationary noise power signal and a first clean power signal and onsets of unvoiced speech in a second frequency band signal are determined based on a second stationary noise power signal and second clean power signal.

28 Claims, 7 Drawing Sheets

METHOD OF DETECTING SPEECH AND SPEECH DETECTOR FOR LOW SIGNAL-TO-NOISE RATIOS

RELATED APPLICATION DATA

This application is a continuation of International Patent Application No. PCT/EP2021/052676 filed on Feb. 4, 2021, which claims priority to and the benefit of European Patent Application No. 20155485.4 filed on Feb. 4, 2020. The entire disclosures of the above applications are expressly incorporated by reference herein.

FIELD

The present disclosure relates in a first aspect to a method of detecting speech of incoming sound at a portable communication device. A microphone signal is divided into a plurality of separate frequency band signals from which respective power envelope signals are derived. Onsets of voiced speech of a first frequency band signal are determined based on a first stationary noise power signal and a first clean power signal and onsets of unvoiced speech in a second frequency band signal are determined based on a second stationary noise power signal and second clean power signal.

BACKGROUND

Detection of speech in incoming sound, such as microphone signal(s) generated in response to the incoming sound, of head-wearable communication devices like hearing aids, hearing instruments, active noise suppressors, headsets etc. is important for numerous signal processing purposes. Speech is often the target signal of choice for optimization of various processing algorithms and functions of the device such as environmental classifiers and noise reduction. For example aggressive speech enhancement, or noise reduction, is only desired at very low and negative SNRs.

These signal processing algorithms often provide best performance at positive signal-to-noise ratios (SNRs) of the incoming sound at the microphone arrangement. Unfortunately, SNRs in challenging sound environments are often lower and negative and the user or patient of the head-wearable communication device may regularly be subjected to such challenging sound environments. Therefore, there is a need for reliably detecting the presence of speech, and possibly estimating speech power, to the head-wearable communication device. The reliable detection of speech at low and negative SNRs of the incoming sound allows the head-wearable communication device to appropriately steer various signal processing algorithms and avoid, or at least reduce, unwanted distortion of an incoming or received speech signal of the incoming sound. For example, when applying noise reduction algorithms to the incoming sound signal it is important to avoid distorting the target speech in the process to maintain speech intelligibility and patient or user comfort.

SUMMARY

A first aspect relates to a method of detecting speech of incoming sound at a portable communication device and a corresponding speech detector configured to carry out or implement the methodology. The method comprises:

generate a microphone signal by a microphone arrangement of the portable communication device in response to the incoming sound, divide the microphone signal into a plurality of separate frequency band signals comprising at least a first frequency band signal suitable for detecting onsets of voiced speech and a second frequency band signal suitable for detecting onsets of unvoiced speech, determine a first power envelope signal of the first frequency band signal and a second power envelope signal of the second frequency band signal, deriving a first stationary noise power signal and first non-stationary noise power signal from first power envelope signal, derive a first clean power signal by subtracting the first stationary noise power signal and the first non-stationary noise power signal from the first power envelope signal, derive a second stationary noise power signal and second non-stationary noise power signal from second power envelope signal, derive a second clean power signal by subtracting the second stationary noise power signal and the second non-stationary noise power signal from the second power envelope signal, determine onsets of voiced speech in the first frequency band signal based on the first stationary noise power signal and first clean power signal, determine onsets of unvoiced speech in the second frequency band signal based on the second stationary noise power signal and second clean power signal, increasing or decreasing a value of a speech probability estimator based on determined onsets of voiced speech and determined onsets of unvoiced speech.

The frequency division or split of the microphone signal into the plurality of separate frequency band signals may be carried out by different types of frequency selective analog or digital filters for example organized as a filter bank operating in either frequency domain time domain as discussed in additional detail below with reference to the appended drawings. The first frequency band signal may comprises frequencies of the incoming sound between 100 and 1000 Hz, such as between 200 and 600 Hz, for example obtained by filtering the incoming sound signal by a first, or low-band, filter configured with appropriate cut-off frequencies, e.g. a lower cut-off frequency of 100 Hz and upper cut-off frequency of 1000 Hz. Hence, the first, or low-band, filter preferably possesses a bandpass frequency response which suppresses subsonic frequencies of the incoming sound, e.g. because these merely comprises low-frequency noise components, and suppresses very high frequency components.

The second frequency band signal may comprise frequencies of the incoming sound between 4 kHz and 8 kHz, such between 5 kHz and 7 kHz, for example obtained by filtering the incoming sound signal by a second, or high-band, filter configured with appropriate cut-off frequencies, e.g. a lower cut-off frequency of 4 kHz and upper cut-off frequency of 8 kHz. Hence, the second, or high-band, filter preferably possesses a bandpass frequency response, but may alternatively merely possess a highpass filter response for example depending on high-frequency response characteristic of the microphone arrangement which supplies the microphone signal.

According to one embodiment of the present method of detecting speech of incoming sound, the plurality of separate frequency bands comprises a third, or mid-band, filter with a frequency response situated in-between the respective frequency responses of the first and second frequency bands. The mid-band filter is configured to generate a third, or mid-frequency, band signal based on the microphone signal. The mid-frequency band filter may for example possess a bandpass response such that the mid-frequency band signal comprise frequencies between 1 and 4 kHz such as between 1.2 and 3.9 kHz by appropriate configuration or selection of lower cut-off and upper cut-off frequencies following the above-mentioned designs. The latter embodiment may utilize the third frequency band signal to determine a third power envelope signal of the third frequency band signal, determining a third noise power envelope and third clean power envelope of the first power envelope signal and determining a third power envelope ratio based on the third noise power and clean power envelopes.

The skilled person will understand that the first frequency band signal preferably comprises dominant frequencies of voiced or plosive speech onsets via the frequency response of the low-band filter while dominant frequencies of unvoiced speech onsets are suppressed or attenuated for example by more than 10 dB or 20 dB. The second frequency band signal preferably comprises dominant frequencies of unvoiced speech onsets via the frequency response of the highband filter while dominant frequencies of voiced or plosive speech onsets are suppressed or attenuated—for example by more than 10 dB or 20 dB. If present, the mid-frequency band signal preferably contains a frequency range or region with least dominant speech harmonics.

The determination of the onsets of voiced speech in the first frequency band signal may be based on a first crest value or factor representative of a relative power or energy between the first clean power signal and the first stationary noise power signal. The first crest value may for example be obtained by dividing the first clean power signal and first stationary noise power signal. The determination of onsets of unvoiced speech in the second frequency band signal may be based on a second crest value representative of a relative power or energy between the second clean power signal and second stationary noise power signal. The second crest value may for example be determined by dividing the second clean power signal and second stationary noise power signal as discussed in additional detail below with reference to the appended drawings.

The first stationary noise power signal may be exploited to provide an estimate of a background noise level of the first frequency band signal and the second stationary noise power signal may similarly be exploited to provide an estimate of a background noise level of the second frequency band signal and so forth for the optional third band signal. The first stationary noise power signal or estimate may comprise or be a so-called "aggressive" stationary noise power signal or estimate and/or the second stationary noise power signal may comprise a so-called "aggressive" stationary noise power signal or estimate that are determined or computed as discussed in additional detail below with reference to the appended drawings.

The first and second non-stationary noise power signals or estimates may be exploited to provide respective estimates of the non-stationary noise in the first and second frequency band signals, respectively, and may be determined or computed as discussed in additional detail below with reference to the appended drawings.

The determination of the first power envelope signal or estimate may comprise:

performing non-linear averaging of the first frequency band signal, for example by lowpass filtering the first frequency band signal using a first attack time and first release time such as a first attack time between 0 and 10 ms and a first release time between 20 ms and 100 ms. The determination of the second power envelope signal or estimate may comprise performing non-linear averaging of the second frequency band signal for example by lowpass filtering the second frequency band signal using a second attack time and a second release time such as a second attack time between 0 and 10 ms and second release time between 20 ms and 100 ms.

The non-linear averaging of the each of the first and second frequency band signals may be viewed as applying these signals to the inputs of respective lowpass filters which exhibit one forgetting factor, i.e. corresponding to the attack time, if or when the frequency band signal exceeds an output of the lowpass filter and another forgetting factor, i.e. corresponding to the release time, when the frequency band signal is smaller than the filter output as discussed in additional detail below with reference to the appended drawings.

One embodiment of the present method comprises determination of a first fast onset probability, fastOnsetProb_1, of the first frequency band signal by comparing the first crest value with predefined minimum and maximum threshold values—for example according to: fastOnsetProb_1=min(1, max(0, (crest−crestThldMin)/(crestThldMax−crestThldMin))).

The latter embodiment may additionally, or alternatively, comprise:

determining a second fast onset probability, fastOnsetProb_2, of the second frequency band signal by comparing the second crest value with predefined minimum and maximum threshold values for example according to: fastOnsetProb_2=min(1, max(0, (crest−crestThldMin)/(crestThldMax−crestThldMin))). The predefined minimum threshold crestThldMin preferably has a value between 1.5 and 3.5 and the predefined maximum threshold crestThldMin preferably has a value between 1.8 and 4.

When the first fast onset probability reaches a value of one the speech detector may take this condition as a direct indication of the onset of voiced speech in the first frequency band signal or alternatively, the speech detector may utilize this condition to apply further test(s) to the first power envelope signal, or its derivative signals, before indicating, or not indicating, the onset of voiced speech depending on the outcome of these further test(s). Likewise, in response to the second fast onset probability reaches a value of one the speech detector may take this condition as a direct indication of the onset of unvoiced speech in the second frequency band signal, or alternatively, the speech detector may utilize the latter condition to apply further test(s) to the second power envelope signal, or its derivative power signals, before indicating, or not indicating, the onset of unvoiced speech depending on the outcome of these further test(s).

The speech detector and present methodology may utilise a duration of the fast onset of the first frequency band signal and/or a duration of the fast onset of the second frequency band signal as criteria for determining whether the fast onset in question is a reliable, or statistically significant, indicator, of the presence of voiced speech onsets or unvoiced speech in the incoming sound and the microphone signal. If the duration of the fast onset of the first or second frequency band signal is less than a predetermined time period such as 0.05 s (50 ms) the fast onset may be categorized as an impulse sound and the value of the speech probability estimator maintained or decreased.

Certain embodiments of the present methodology of detecting speech which determine the durations of the fast onsets in the first and/or second frequency band signals and therefore may further comprise:

indicate occurrence of a fast onset in the first frequency band signal in response to the first fast onset probability, fastOnsetProb_1, reaches a value of one, determine a duration of the fast onset in the first frequency band signal, compare the duration of the fast onset to a first duration threshold, such as 50 ms, if the duration of the fast onset in the first frequency band signal exceeds the first duration threshold in response: categorize the fast onset as a speech onset and increase the value of the speech probability estimator; otherwise categorize the fast onset as an impulse and maintain or decrease the value of the speech probability estimator.

Certain embodiments of the present methodology of detecting speech check or monitor the power of the first and second clean power signals, as derived from the first and second frequency band signals, respectively, and may therefore further comprise:

in response to the fast onset in the first frequency band signal is categorized as a speech onset:

determine whether power of the first clean power signal following the fast onset is significantly larger than power of the second clean power signal of the second frequency band signal following the fast onset, and if fulfilled increase the value of the speech probability estimator; otherwise:

maintain or decrease the value of the speech probability estimator.

The speech detector may likewise be configured to indicate occurrence of a fast onset in the second frequency band signal in response to the second fast onset probability, fastOnsetProb_1, reaches a value of one, determine a duration of the fast onset in the second frequency band signal, compare the duration of the fast onset to the first duration threshold, such as 50 ms, if the duration of the fast onset in the second frequency band signal exceeds the first duration threshold in response: categorize the fast onset as a speech onset and increase the value of the speech probability estimator; otherwise categorize the fast onset as an impulse and maintain or decrease the value of the speech probability estimator.

The speech detector may additionally be configured to:

in response to the fast onset in the second frequency band signal is categorized as a speech onset:

determine whether power of the second clean power signal following the fast onset in second frequency band signal is significantly larger than power of the first clean power signal of the first frequency band signal following the fast onset; and if fulfilled increase the value of the speech probability estimator; otherwise: maintain or decrease the value of the speech probability estimator.

One embodiment of the present method of detecting speech and corresponding speech detector further comprises:

determine whether or not multiple fast onsets are indicated concurrently in the first and second frequency band signals and if so or true:

categorize the fast onsets in the first and second frequency band signals as impulse sounds; and maintain or decrease the value of the speech probability estimator.

In contrast, in case the multiple fast onsets are not indicated concurrently in the first and second frequency band signals:

categorize the fast onsets in the first and second frequency band signals as onsets of voiced speech and unvoiced speech, respectively; and increase the value of the speech probability estimator.

One embodiment of the present method of detecting speech and a corresponding speech detector further comprises:

detect a first point in time for the occurrence of the fast onset in the first frequency band signal and detect a second point in time for the occurrence of the fast onset in the second frequency band signal, determine a time difference between the first and second points in time, compare the time difference to a predetermined time threshold such as 2 s or 1 s; and increase the value of the speech probability estimator if the time difference is smaller the predetermined time threshold; otherwise maintain or decrease the value of the speech probability estimator.

The latter embodiment is therefore helpful to further distinguish between e.g. speech like low-frequency dominant noise in the received microphone signal true voiced speech in the microphone signal because a fast onset in the low-frequency (first) band signal rarely or never is accompanied by a fast onset in the high-frequency (second) frequency band signal concurrently, or close thereto, in time due the temporal characteristics of human speech. Hence, the latter embodiments avoid that the speech detector and methodology by mistake indicate or flag speech like low-frequency dominant noise as voiced speech onsets.

The method of detecting speech may further comprise:

compare the speech probability estimator to a predetermined speech criterion, such as a predetermined threshold; and indicate speech in the incoming sound at compliance with the predetermined speech criterion; and optionally adjusting a parameter value of signal processing algorithm executed on the portable communication device for example by a microprocessor and/or DSP.

A second aspect relates to a speech detector configured, adapted or programmed to receive and process the microphone signal, or its derivatives such as one or more of the first and second frequency band signals, the first and second power envelope signals, the first and second stationary noise power signals, the first, second clean power signals etc., in accordance with any of the above-described methods of detecting speech. The speech detector may be executed or implemented by dedicated digital hardware on a digital processor or by one or more computer programs, program routines and threads of execution running on a software programmable digital processor or processors or running on a software programmable microprocessor. Each of the computer programs, routines and threads of execution may comprise a plurality of executable program instructions that may be stored in non-volatile memory of a head-wearable communication device. Alternatively, the audio processing algorithms may be implemented by a combination of dedicated digital hardware circuitry and computer programs, routines and threads of execution running on the software programmable digital signal processor or microprocessor. The software programmable digital processor, microprocessor and/or the dedicated digital hardware circuitry may be integrated on an Application Specific Integrated Circuit (ASIC) or implemented on a FPGA device.

A third aspect relates to a portable device such as a head-wearable communication device for example a hearing aid, hearing instrument, active noise suppressor or headset, comprising:

- a microphone arrangement configured to supply one or more microphone signal(s) in response to the incoming sound,
- one or more digital processors, such as one or more microprocessors and/or DSPs, configured, adapted or programmed to implement the speech detector, for example using a set of executable program instructions on the one or more digital processors.

The hearing aid may be a BTE, RIE, ITE, ITC, CIC, RIC, IIC etc. type of hearing aid which comprises a housing shaped and sized to be arranged at, or in, the user's ear or ear canal.

DETAILED DESCRIPTION

Figure 1:
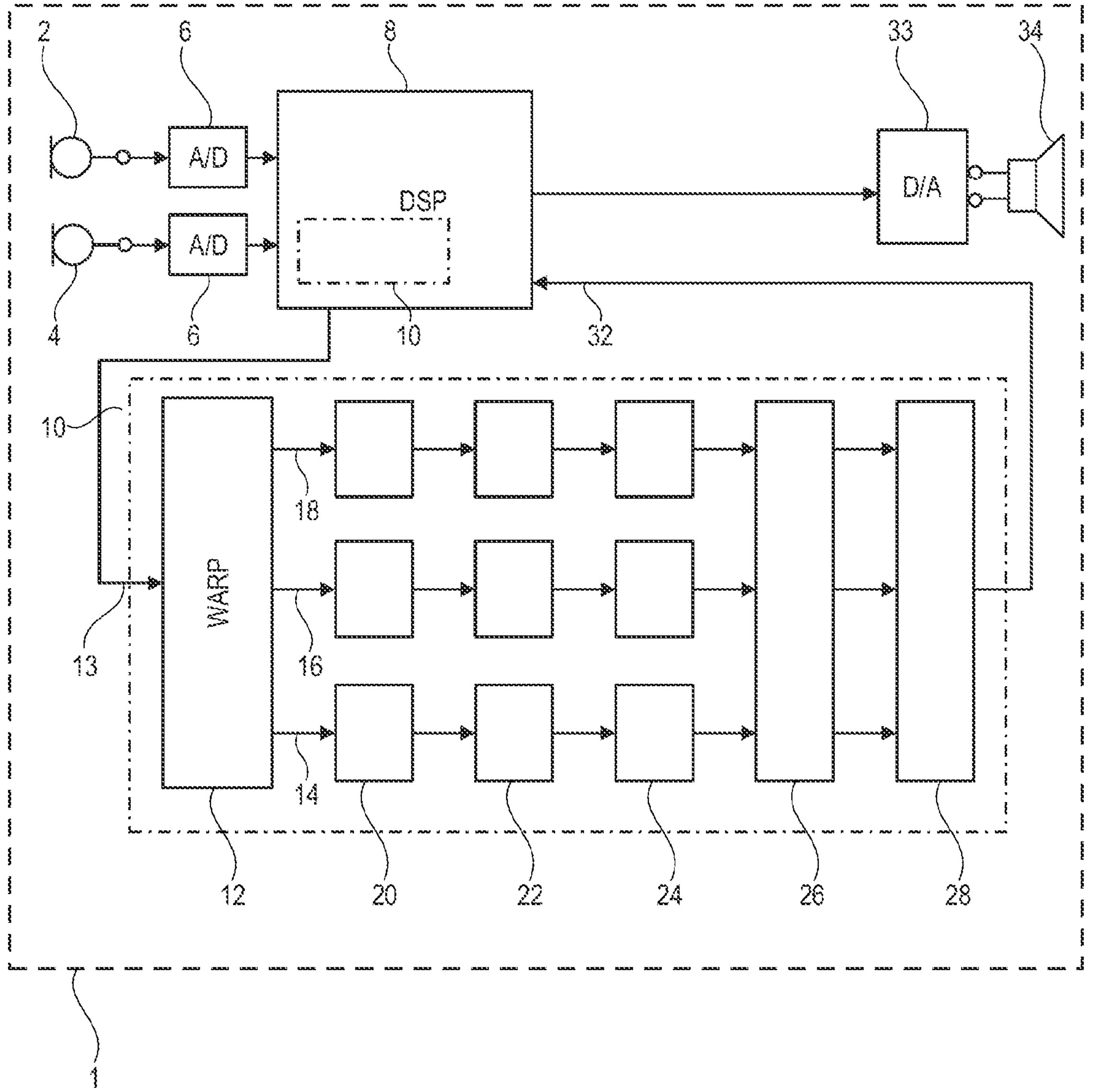
FIG. 1 is a schematic block diagram of a head-wearable communication device comprising a speech detector in accordance with an exemplary embodiment.

Various embodiments are described hereinafter with reference to the figures. It should be noted that the figures are not drawn to scale and that elements of similar structures or functions are represented by like reference numerals throughout the figures. Like elements will, thus, not necessarily be described in detail with respect to each figure. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of the present speech detector and corresponding methodology of detecting speech in incoming sound are described with reference to the appended drawings.

FIG. 1 is a schematic block diagram of a head-wearable communication device 1, for example a hearing aid, hearing instrument, active noise suppressor or headset etc., comprising a speech detector 10 in accordance with an exemplary embodiment. The head-wearable communication device 1 comprises a microphone arrangement which comprises at least one microphone and preferably comprises first and second omnidirectional microphones 2, 4 that generate first and second microphone signals, respectively, in response to incoming or impinging sound. Respective sound inlets or ports (not shown) of the first and second omnidirectional microphones 2, 4 may be arranged with a certain spacing in a housing portion (not shown) of the head-wearable communication device 1 so as to enable the formation of the various types of beamformed microphone signals.

The head-wearable communication device 1 preferably comprises one or more analogue-to-digital converters (A/Ds) 6 which convert analogue microphone signals into corresponding digital microphone signals with certain resolution and sampling frequency before inputted to a software programmable, or hardwired, microprocessor or DSP 8 of the head-wearable communication device 1. The software programmable, DSP 8 comprises or implements the present speech detector 10 and the corresponding methodology of detecting speech. The skilled person will understand that the speech detector 10 may be implemented as dedicated computational hardware of the DSP 8 or implemented by a set of suitably configured executable program instructions executed on the DSP 8 or by any combination of dedicated computational hardware and executable program instructions. The operation of the head-wearable communication device 1 may be controlled by a suitable operating system executed on the software programmable DSP 8. The operating system may be configured to manage hardware and software resources of the head-wearable communication device 1, e.g. including peripheral device, I/O port handling and determination or computation of the below-outlined tasks of the speech detector etc. The operating system may schedule tasks for efficient use of the hearing aid resources and may further include accounting software for cost allocation, including power consumption, processor time, memory locations, wireless transmissions, and other resources.

If the head-wearable communication device 1 comprises, or implements, a hearing aid it may additionally comprise a hearing loss processor (not shown). This hearing loss processor is configured to compensate a hearing loss of a user of the hearing aid. The hearing loss compensation may be individually determined for the user via well-known hearing loss evaluation methodologies and associated hearing loss compensation rules or schemes. The hearing loss processor may for example comprises a well-known dynamic range compressor circuit or algorithm for compensation of frequency dependent loss of dynamic range of the user of the device. The digital microphone signal or signals are applied to an input 13 of the speech detector 10 which in response outputs a speech flag or marker 32 which indicate speech in the incoming sound to the DSP 8 for example via a suitable input port of the DSP 8. The DSP may therefore use the speech flag to adjust or optimizes values of various types of signal processing parameters as discussed above. The DSP 8 generates and outputs a processed microphone signal to a D/A converter 33, which preferably may be integrated with a suitable class D output amplifier, before the processed output signal is applied to a miniature loudspeaker or receiver 34. The loudspeaker or receiver 34 converts the processed output signal into a corresponding acoustic signal for transmission into the user's ear canal.

The speech detector 10 comprises a filter bank 12 which is configured to divide or split the digital microphone signal into a plurality of separate frequency band signals 14, 16, 18 via respective frequency selective filter bands. The skilled person will appreciate that the filter bank 12 in alternative embodiments may be external to the speech detector and merely the relevant output signals of the filter bank routed into the speech detector. The plurality of separate frequency band signals 14, 16, 18 preferably at least comprises a first frequency band signal 14, e.g. low-frequency band signal, suitable for detecting onsets of voiced speech and a second frequency band signal 18, e.g. high-frequency band signal, suitable for detecting onsets of unvoiced speech. The plurality of separate frequency band signals 14, 16, 18 may additionally comprise a third frequency band 16, or mid-frequency band signal 16, situated in-between the first and second frequency bands. The skilled person will appreciate that the filter bank 12 may comprise a frequency domain filter bank, e.g. FFT based, or a time domain filter bank for example based on FIR or IIR bandpass filters.

Figure 2:
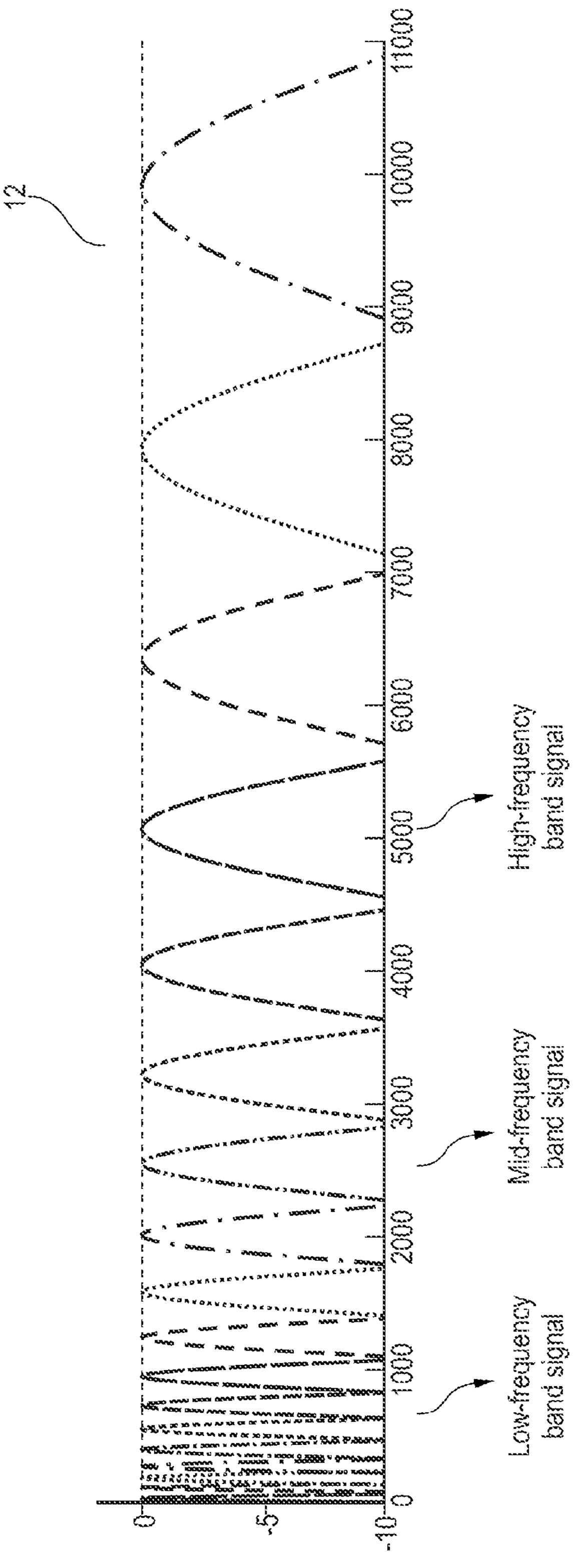
FIG. 2 shows a schematic block diagram of a filter bank of the speech detector in accordance with an embodiment.

One embodiment of the filter bank 12 comprises a so-called WARP filter bank as generally disclosed by the applicant's earlier patent application U.S. 2003/0081804. The frequency domain transformation, e.g. FFT, of the digital microphone signal is computed on a warped frequency scale results in numerous desirable properties such as minimal time delay as the direct signal path contains only a short input buffer and the FIR compression filter. Other noticeable advantages are absence of aliasing and a natural log-scale of the analysis frequency bands conforming nicely to the Bark based frequency scale of human hearing. FIG. 2 illustrates 18 separate frequency bands provided by an exemplary embodiment of the WARP filter bank 12. The low-frequency band signal 14 may be obtained by summing outputs of several of the warped filters for example bands 2, 3 and 4 such that the low-frequency band signal 14 comprises frequencies of the incoming sound between about 100-1000 Hz, more preferably between 200-600 Hz. Adjacent frequencies are attenuated according to the roll-off rate or steepness of the warped bands. The high-frequency band signal 18 may be obtained by summing outputs of several of other of the warped filter bands for example bands 14, 15 and 16 such that the high-frequency band signal 18 comprises frequencies of the incoming sound between about 4-8 kHz such between 5-7 kHz. The optional mid-frequency band signal 16 may comprise frequencies between 1000-4 kHz such between 1.2-3.9 kHz and obtained by summing outputs of the warped bands 11, 12 and 13. The skilled person will appreciate that the splitting of the digital microphone signal into the above-outlined separate low-frequency, high-frequency and mid-frequency bands ensures that the low-frequency band contains dominant frequencies of voiced/plosive speech onsets while the high-frequency band contains dominant frequencies of unvoiced speech. The mid-frequency band preferably contains the frequency range or region with the least dominant speech harmonics.

The speech detector 10 additionally comprises respective signal envelope detectors 20 for the low-frequency band signal 14, mid-frequency band signal 16 and high-frequency band signal 18 to derive or determine respective power envelope signals as discussed in additional detail below. The speech detector 10 further comprises three noise estimators or detectors 22 that derive various noise power envelopes, clean power envelopes and certain envelope ratios from each of the power envelope signals as discussed in additional detail below. Outputs of the three noise estimators or detectors 22 are inputted to respective fast onset detectors 24 that monitors the presence the fast onsets across the low-frequency, mid-frequency and high-frequency bands. The latter results are applied to respective inputs of a fast onset distribution detector 26. The computed fast onset distributions are finally applied to a probability estimator 28 which is configured to increase or decrease a value of a speech probability and on that basis flag or indicate to the DSP 8 the presence of speech in the incoming sound as discussed in additional detail below.

Figure 3:
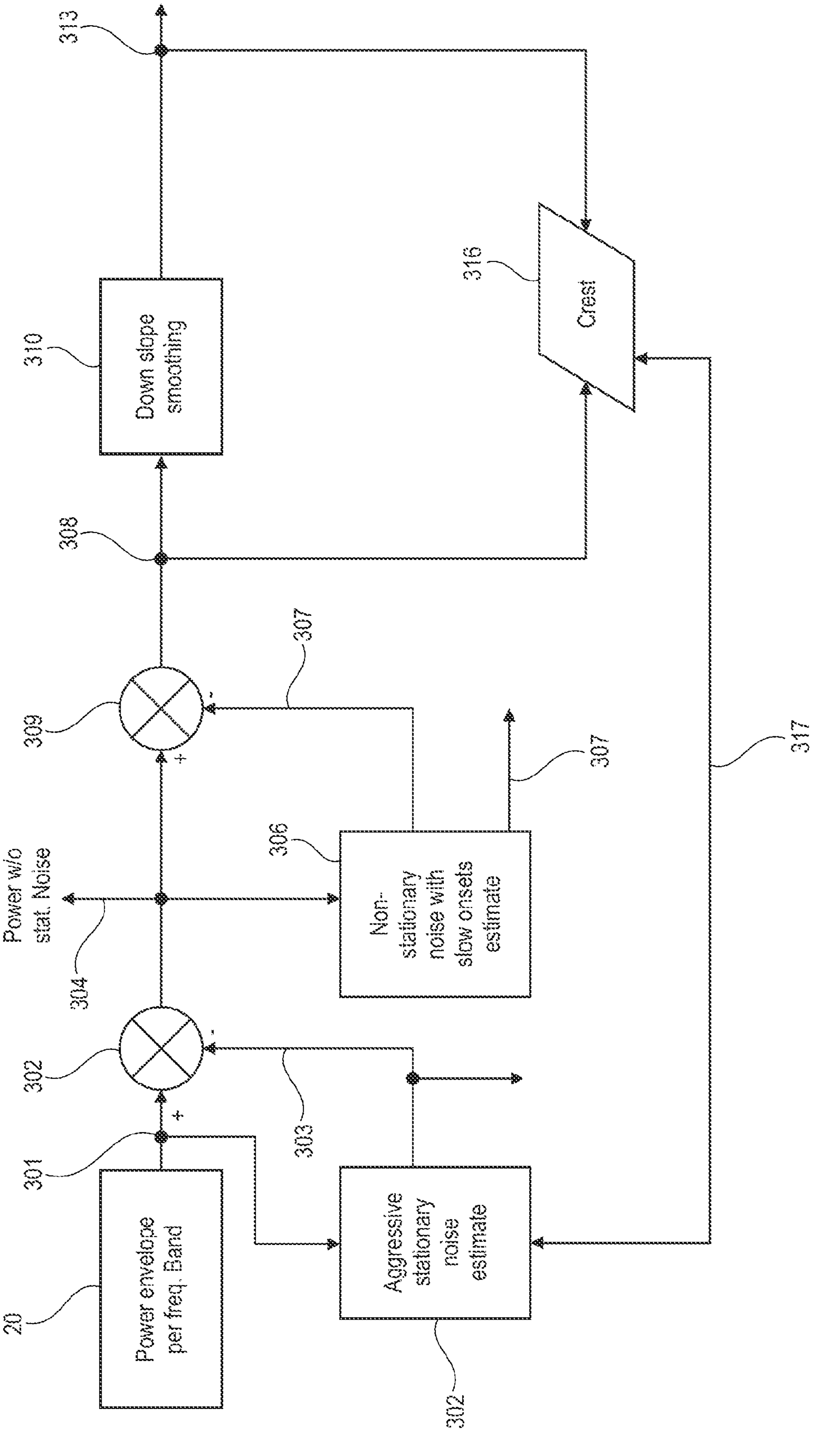
FIG. 3 shows a schematic block diagram of various intermediate signal processing functions and corresponding noise power signals and clean power signals of the exemplary speech detector.

FIG. 3 shows a schematic block diagram of various intermediate signal processing functions or steps, in particular estimation or determination of certain envelope ratios, carried out by the speech detector 10 on each of the low-frequency band signal 14, mid-frequency band signal 16 and the high-frequency band signal 18. In step 20, the DSP 8 extracts, computes or determines a low-frequency, or first, power envelope or power envelope signal 301 of the frequency band signal in question, e.g. the low-frequency band signal 14. The first power envelope signal 301 may for example be determined by performing non-linear averaging of the first frequency band signal 14 in step/function 20—for example by lowpass filtering the first frequency band signal 16 using an attack time between 0 and 10 ms and a release time between 20 ms and 100 ms such as between 20 ms and 35 ms.

This non-linear averaging may be viewed as lowpass filtering using a lowpass filter with one forgetting factor, i.e. corresponding to the attack time, if or when the first frequency band signal 14 exceeds an output of the lowpass filter and another forgetting factor, i.e. corresponding to the release time, when the first frequency band signal 14 is smaller than the filter output (release). This non-linear averaging can more generally be stated as:

When x is the input signal of the non-linear averaging and s is the output signal of the non-linear averaging:

```
e=x−s;

attMode=(e>0);

ff=attMode.*p.ffAtt+(1−attMode).*p.ffRel;

s=s+ff.*e;
```

The transformation from attack time and release time to variables p.ffAtt and p.ffRel, respectively, is given by:

```
tau=timeInSeconds/2.3;

ff=1−exp(−1./(fs*tau));
```

Where fs is the sampling time of the input signal and * denotes multiplication.

The DSP 8 additionally extracts, computes or determines a high-frequency, or second, power envelope signal of the high-frequency band signal 18 in a corresponding manner and may be using identical, or alternatively somewhat shorter, attack and release times in view of the higher frequency components or content of the high-frequency band signal 18. The latter times may comprise an attack time between 0 and 5 ms and a release time between 5 ms and 35 ms. The DSP 8 may optionally extract, compute or determine a mid-frequency, or third, power envelope signal of the mid-frequency band signal 16 in a corresponding manner and may be using identical or somewhat shorter attack and release times for the non-linear averaging of the mid-frequency band signal 16 compared to those of the low-frequency band signal 18.

During step 22, the DSP 8 extracts, computes or determines various power envelope signals that are utilized for detection or identification of certain fast speech onsets within each of the low-frequency band, high-frequency band and mid-frequency band. The DSP 8 extracts, computes or determines a so-called low-frequency, or first, stationary noise power signal based on the low-frequency power envelope signal. The DSP 8 additionally extracts, computes or determines a high-frequency, or second, stationary noise power signal based on the high-frequency power envelope signal in a corresponding manner. The DSP 8 may finally extract, compute or determine a mid-frequency, or third stationary noise power signal based on the mid-frequency power envelope signal in a corresponding manner. This process or mechanism is schematically illustrated on FIG. 3 where the DSP in step/function 302 carries out computation of the low-frequency, high-frequency and mid-frequency stationary noise power signals 303 based on the respective ones of the low-frequency, high-frequency and mid-frequency power envelope signals 301 provided by step/function 20. The computation of these low-frequency, high-frequency and mid-frequency stationary noise power signals 303 serve to provide an accurate estimate of the background noise power level in, or of, the incoming sound as represented by the digital microphone signal or signals. Each of the low-frequency, high-frequency and mid-frequency stationary noise power signals 303 may comprise an aggressive stationary noise power signal 303 as discussed below in additional detail.

Figure 6:
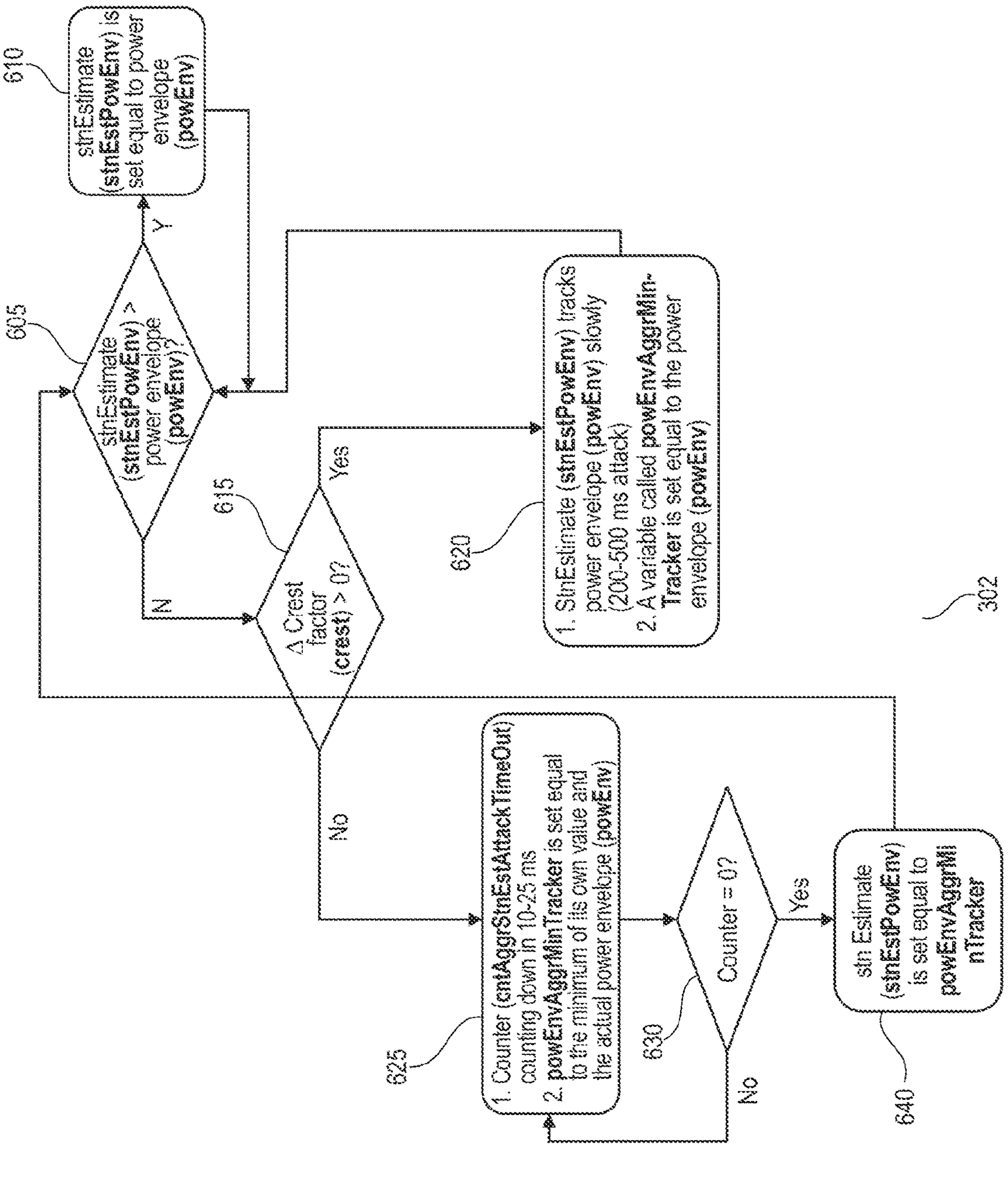
FIG. 6 is a flow chart of signal processing steps carried out by the speech detector to determine an aggressive stationary noise power signal or estimate for each power envelope signal.

Overall, the speech detector 10 may be configured to determine the aggressive stationary noise power signals 303 (stn estimates) for the corresponding power envelope signals 301 as schematically illustrated by a signal flowchart 600 of FIG. 6, by:

In step 615 in response to an increasing crest value or ratio 317 as computed and outputted by block/function 316 as discussed below, the speech detector jumps to step 620 and lets the aggressive stationary noise power signal 303 slowly track the power envelope signal 301, preferably with a settling time, e.g. implemented as time constant of a lowpass filter, between about 200 ms and 500 ms;

In step 620, the speech detector sets a variable called powEnvAggrMinTracker equal to the power envelope signal 301 and proceeds to step 605;

In step 615 in response to a stationary or decreasing crest value or ratio 317, the speech detector jumps to step 625 wherein a counter starts to count down in about 10 ms to 25 ms in a sub-step 1;

The aggressive stationary noise power signal 303 keeps slowly tracking the power envelope signal 301, e.g. by linear or non-linear lowpass filtering of the power envelope signal 301 as set forth by step 620; In sub-step 2 of step 625, the variable powEnvAggrMinTracker is set equal to a minimum of its own value and a current value of the power envelope signal 301, i.e.

powEnvAggrMinTracker=min(powEnvAggrMinTracker,powerEnvelope);

When the counter reaches zero in step 630, speech detector jumps to step 640 and sets the aggressive stationary noise power signal 303 (stn estimate) equal to powEnvAggrMinTracker; The speech detector subsequently jumps to step 605 and determines whether the power envelope signal 301 is smaller than the aggressive stationary noise power signal 303: If yes, the speech detector jumps to step 610 and sets the aggressive stationary noise power signal 303 equal to the power envelope signal 301. Thereafter, the speech detector jumps back to step 605 and repeats the comparison between the power envelope signal 301 and aggressive stationary noise power signal 303.

The skilled person will understand that the stationary noise power signal or estimate estimates a noise floor of incoming sound within the frequency band signal in question. Hence, the stationary noise power signal can be understood as tracking a minimum noise power in the relevant frequency band signal. The present aggressive stationary noise signal or estimate 303 fluctuates markedly more than a traditional stationary noise power estimate. The present aggressive stationary noise signal or estimate 303 is configured to estimate power of the power envelope signal 301 just before an increase in power to estimate power of a new onset as discussed in additional detail below in connection with the computation of the non-stationary noise power signal 307.

An exemplary code to implement the steps of the signal flowchart 600 follows here:

```
if powEnv > stnEstPowEnv
  if powEnv − stnEstPowEnv > stnRemovedPowEnvMax
    stnRemovedPowEnvMax = powEnv − stnEstPowEnv;
  else
    if powEnv < powEnvAggrMinTracker
      powEnvAggrMinTracker = powEnv;
    end
    if cntAggrStnEstAttackTimeOut == cntAggrStnEstAttackTimeOutInit
      crestPowEnvMaxDurFastOnsetRel = crest;
    end
  end
  cntAggrStnEstAttackTimeOut =
  max(0, cntAggrStnEstAttackTimeOut − 1);
  if cntAggrStnEstAttackTimeOut > 0
    corrNonStnTr = ParFfAttStnEstPowEnvSlow*max(0, cleanPowEnv);
    else
      corrNonStnTr = powEnvAggrMinTracker − stnEstPowEnv;
      fastOnsetProbMax = 0;
    end
    stnEstPowEnv = stnEstPowEnv + corrNonStnTr;
  else
    stnEstPowEnv = max(powEnv, stnEstPowEnvMin);
    corrNonStnTr = 0;
  end
  if powEnv <= stnEstPowEnv || cntAggrStnEstAttackTimeOut == 0
    crestPowEnvMaxDurFastOnsetRel = 0;
    stnRemovedPowEnvMax = 0;
    cntAggrStnEstAttackTimeOut = cntAggrStnEstAttackTimeOutInit;
  end; wherein
powEnv = power envelope signal 301;
stnEstPowEnv = Power without stationary noise signal 304;
cntAggrStnEstAttackTimeOutInit = timeOutInSeconds*sampling time and
timeOutInSeconds preferably is set to between 12 ms to 25 ms;
ParFfAttStnEstPowEnvSlow= 1 − exp(−1./(fs*tau));
where tau = timeInSeconds/2.3, * denotes multiplication,
fs is a sampling time of the power envelope signal 301; and
timeInSeconds is set to 200 to 400 msec.
All states are preferably initialized at zero.
```

The computations of the crest and cleanPowEnv variables are outlined in detail below.

Reverting to FIG. 3, the speech detector 10 proceeds by function 302 to subtract the aggressive stationary noise power signal 303 from the power envelope signal 301 to generate the above-mentioned power envelope signal without stationary noise 304 (stnEstPowEnv) in each of the frequency bands. The power envelope signal without stationary noise 304 may be viewed as the frequency band signal in question cleaned from stationary noise. As illustrated by the signal flowchart of FIG. 3, the power envelope signal without, i.e. cleaned from, stationary noise 304 is applied to the input of a block/function 306 which additionally extracts, computes or determines the so-called low-frequency, or first, non-stationary noise power signal or estimate 307. The speech detector 10 additionally extracts, computes or determines a high-frequency, or second, non-stationary noise power signal or estimate 307 based on the high-frequency power envelope signal 301 in a corresponding manner and optionally computes a mid-frequency, or third, non-stationary noise power signal 307 based on the mid-frequency power envelope signal 301 in a corresponding manner.

The respective roles of the aggressive stationary noise power signal 303, non-stationary noise power signal or estimate 307 and clean power signal or estimate 313 of a particular frequency band signal may be understood by considering a frequency band signal, derived from the incoming sound, which includes a mixture of sound sources comprising a stationary noise source, a non-stationary noise source and target speech. In that common sound situation the stationary noise power signal indicates or tracks the noise floor of the frequency band signal and, hence, a true stationary noise power. This true stationary noise power also corresponds to a minimum value of the aggressive stationary noise power signal 303. When the frequency band signal, and the corresponding power envelope signal 301, comprises or encounters a non-stationary noise "jump" or "bump", an ordinary stationary noise power estimate will remain substantially constant and not influenced by the non-stationary noise "jump" or "bump". In contrast, the present aggressive stationary noise power signal 303 will, after the onset of the non-stationary noise "jump" or "bump" has died out become equal to a total noise in the frequency band signal. Now assume that a speech onset takes place after the non-stationary noise "jump" or "bump" has died out. The best estimate of the power of that speech onset is obtained by a difference of the power of the frequency band signal just before the speech onset, which was tracked by the aggressive stationary noise power signal 303, and the power after the speech onset has died out. So the aggressive stationary noise power signal 303 provides the speech detector with an estimate of the total power increase of the frequency band signal caused by each new jump in power.

Figure 7:
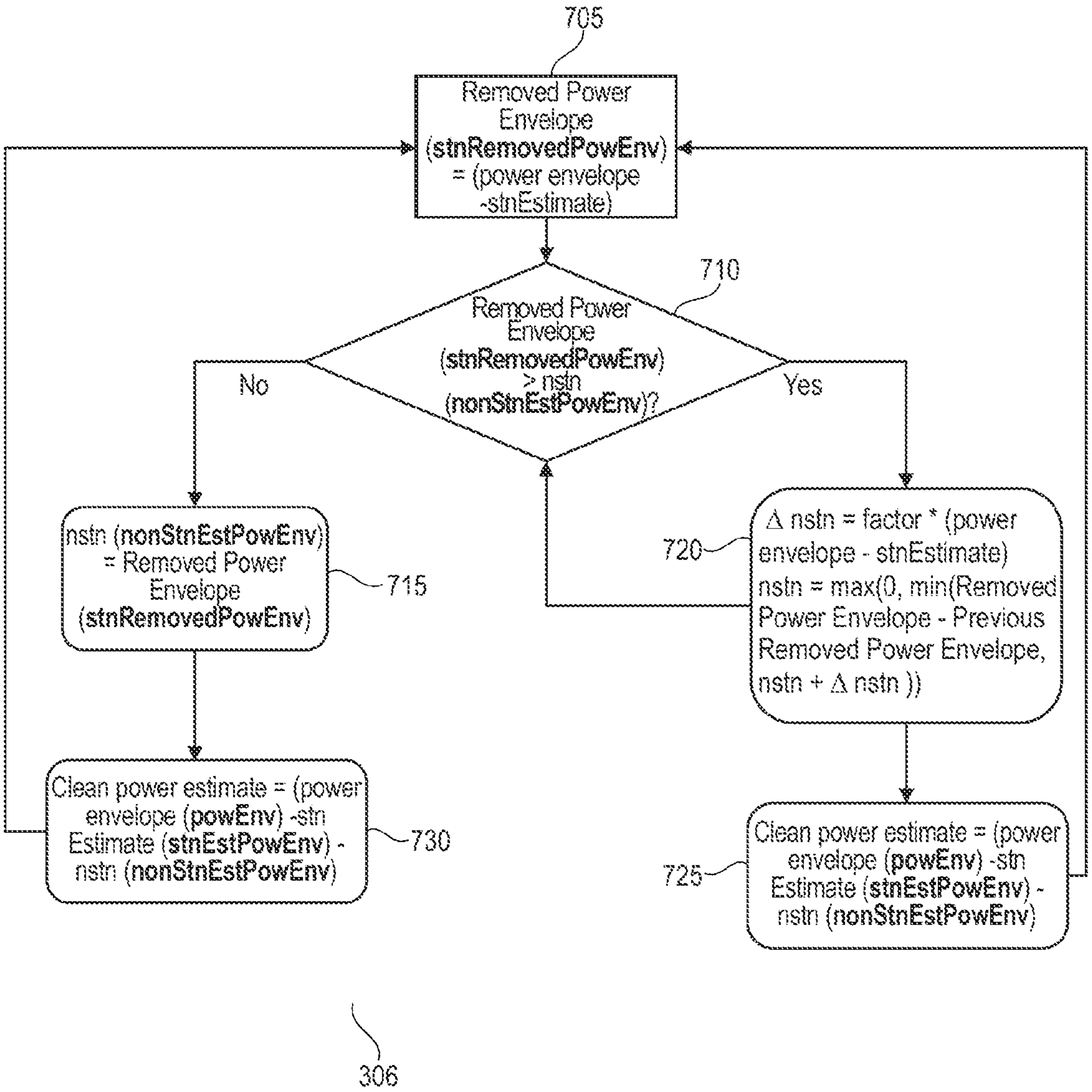
FIG. 7 is a flow chart of signal processing steps carried out by the speech detector to determine a non-stationary noise power signal for each power envelope signal.

Each of the non-stationary noise power signals 307 may be determined or computed by block 306 of the speech detector using signal processing steps schematically illustrated on the flowchart on FIG. 7. In step 705, the speech detector 10 defines a variable stnRemovedPowerEnvelope=power envelope signal 301 minus (−) aggressive stationary noise power signal 303; In step 710, in response to the value of stnRemovedPowerEnvelope exceeds the non-stationary noise power signal 307, the speech detector jumps to step 720. In step 720 an estimated increase in the non-stationary noise power signal or estimate 307 is set equal to a forgetting factor times the power envelope signal 301 minus the aggressive stationary noise power signal 303; where the forgetting factor corresponds to a settling time of about 30 to 40 msec. Further in step 720, the non-stationary noise power signal 307 (nstn estimate) is set equal to max(0,min(stnRemovedPowerEnvelope minus stnRemovedPowerEnvelopePrev, the non-stationary noise power signal 307+estimated increase (delta) in the non-stationary noise power signal 307));

In step 725, the clean power signal or estimate 313 is determined as the power envelope signal 301 minus the aggressive stationary noise power signal 303 minus the non-stationary noise power signal 307 as depicted on FIG. 3.

In step 710, in response to the value of stnRemovedPowerEnvelope is smaller than the non-stationary noise power signal 307, the speech detector jumps to step 715 wherein the non-stationary noise power signal or estimate 307 (nstn) is set equal to the value of stnRemovedPowerEnvelope; the speech detector proceeds to step 730 and determines the clean power signal or estimate 313 as the power envelope signal 301 minus the aggressive stationary noise power signal 303, corresponding to signal 304 and from latter subtracts the non-stationary noise power signal or estimate 307 as depicted on FIG. 3 if the optional down-slope smoothing function 310 is disregarded or omitted as discussed below.

An exemplary code snippet to implement block 306 to compute or determine the non-stationary noise power signal 307 according to the signal flowchart of FIG. 7 follows here:

```
nonStnEstPowEnv = max(0,nonStnEstPowEnv − corrNonStnTr);
  if stnRemovedPowEnv > nonStnEstPowEnv
    nonStnEstPowEnvTmp = nonStnEstPowEnv + ...
      parFfAttNonStnEstPowEnv*(stnRemovedPowEnv −
      nonStnEstPowEnv);
    if (stnRemovedPowEnv − nonStnEstPowEnvTmp) > ...
        (stnRemovedPowEnvPrev − nonStnEstPowEnv)
      nonStnEstPowEnv = nonStnEstPowEnvTmp;
    else
      step = max(0, stnRemovedPowEnv − stnRemovedPowEnvPrev);
      nonStnEstPowEnv = nonStnEstPowEnv + step;
    end
  else
    nonStnEstPowEnv = max(0, stnRemovedPowEnv);
  end
cleanPowEnv = powEnv − stnEstPowEnv − nonStnEstPowEnv; (in linear
domain);
      Where parFfAttNonStnEstPowEnv =1 − exp(−1./(fs*tau)) where
tau = timeInSeconds/2.3,
fs is the sampling time and timeInSeconds may be set to a value between
10 ms and 100 ms such as between 25 ms and 40 msec.
All states or variables are preferably initialized at zero.
```

In summary, for each frequency band signal, the associated clean power signal 313 is generated by subtracting the associated aggressive stationary noise power signal 303 and the, optional, associated non-stationary noise power signal 307 from the power envelope signal 301. The computation of these non-stationary noise power signals is optional but may serve to obtain accurate estimates of the first, second and third clean power signals 313 and ultimately increase the accuracy of the speech detection.

The speech detector 10 is configured or programmed to proceed by computing certain peak-to minimum power envelope factors or ratios in the low-frequency, mid-frequency and high-frequency bands. The speech detector preferably exploit one or more of these peak-to minimum power envelope ratios power envelope ratios to identify or indicate voiced speech onsets and unvoiced speech onsets in the incoming sound. More specifically, the speech detector 10 is preferably configured to, in step 316, determine the low-frequency power envelope ratio by determining a low-frequency, i.e. first, crest factor or ratio 317 using the crest block or function 316 by dividing the low-frequency clean power signal 313 and low-frequency aggressive stationary noise power signal 303. The low-frequency crest ratio 317=crest is preferably determined by estimating a peak-to-minimum power envelope ratio or value between the low-frequency clean power signal 313 and low-frequency aggressive stationary noise power signal 303, i.e.

crest factor 317=(clean power signal 313)/(aggressive stationary noise power estimate)=cleanPowEnv/stnEstPowEnv;

The speech detector 10 may be configured to compute high-frequency and mid-frequency crest ratios 317 in a corresponding manner based on the respective high-frequency and mid-frequency clean power signals 313 and aggressive stationary noise power signals 303. The skilled person will appreciate that each of the crest ratios 317 may be indicative of a peakiness of the corresponding power envelope signal 301 after removal of all stationary noise components and non-stationary noise components.

Figure 4:
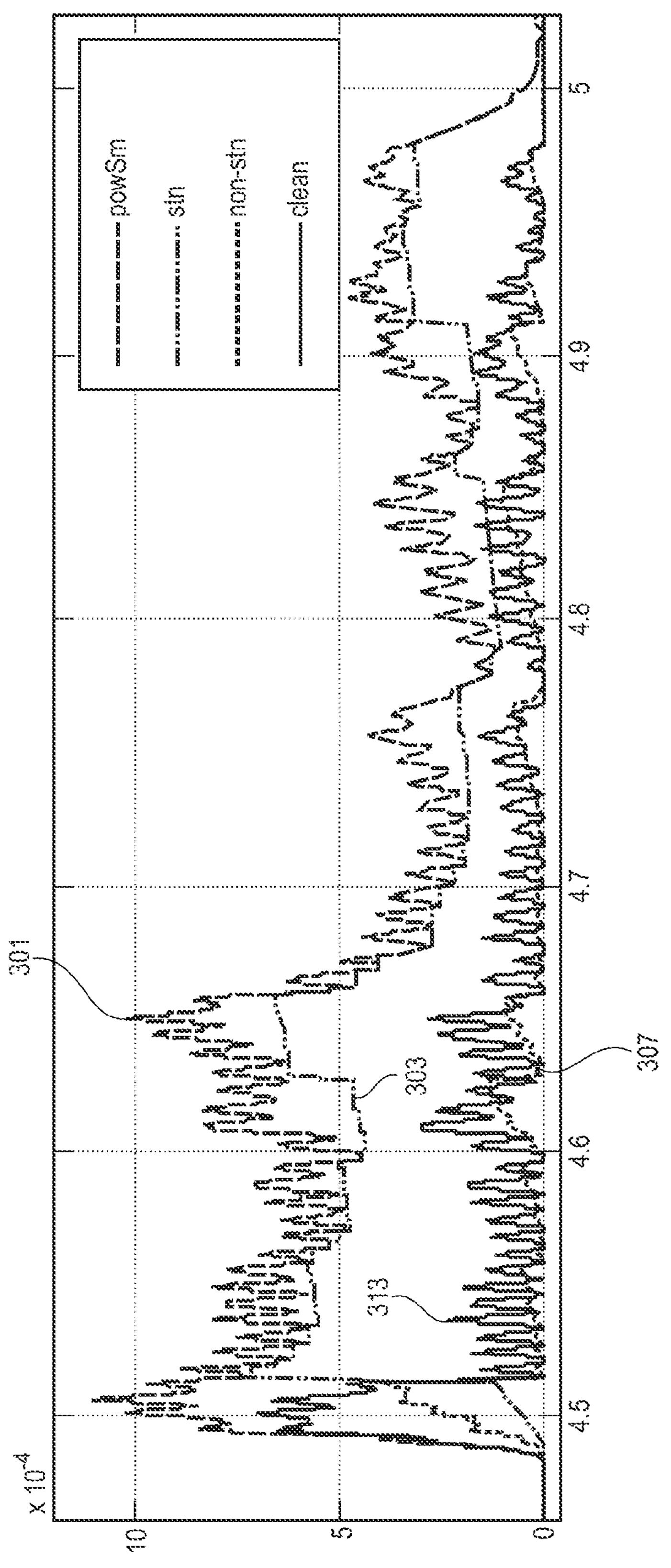
FIG. 4 shows time segments of various power envelope signals derived from a low-frequency signal.

FIG. 4 illustrates the results of the above-mentioned power envelope determinations in the low-frequency band for an exemplary noisy speech signal over a time span or segment of about 500 ms. Plot 301 is the determined low-frequency power envelope signal, plot 303 is the low-frequency aggressive stationary noise power signal, plot 307 is the low-frequency non-stationary noise power signal and finally, plot 313 is the corresponding low-frequency clean power signal 313. It is evident that the low-frequency clean power signal 313 largely only contains fast envelope power jumps or fluctuations.

Figure 5:
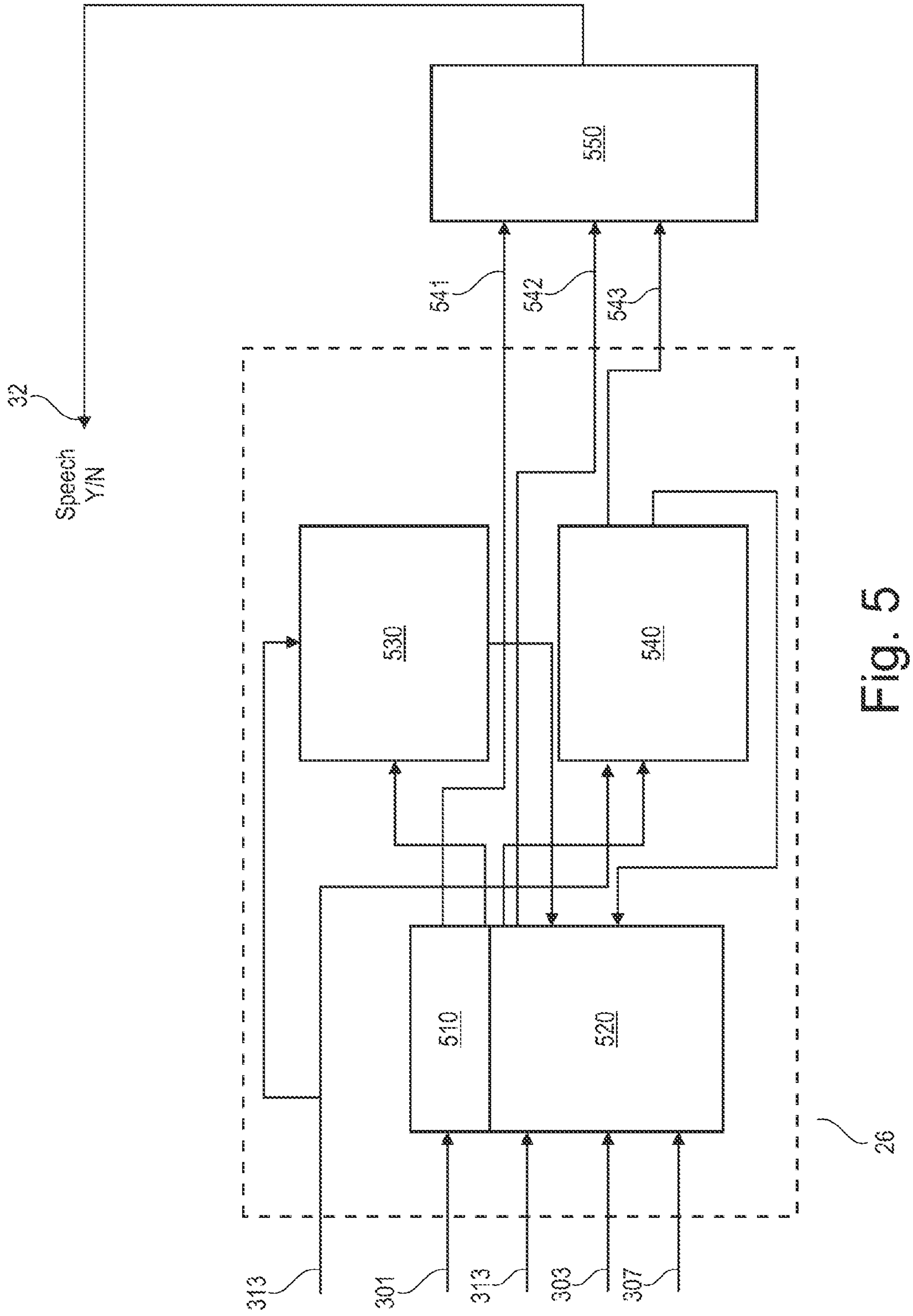
FIG. 5 is a schematic diagram of signal processing steps carried out by the speech detector to compute a speech probability estimator based on indications of voiced speech onsets and unvoiced speech onsets of low-frequency and high-frequency signals, respectively.

FIG. 5 is a schematic flow chart of signal processing steps carried out by an exemplary embodiment of the fast onset detectors 26 of the speech detector 10 (refer to FIG. 1) executed on the DSP to compute a speech probability estimator based on indications of voiced speech onsets and unvoiced speech onsets in the low-frequency and high-frequency bands, respectively. The speech detector 10 utilizes the above-discussed low-frequency, high-frequency and optionally the mid-frequency power envelope signals 301, the low-frequency, high-frequency and mid-frequency aggressive stationary noise power signals 303, the low-frequency, high-frequency and mid-frequency non-stationary noise power signals 307 and the low-frequency, high-frequency and mid-frequency clean power signals 313.

In step or function 510 the speech detector 10 initially determines a low-frequency, or first, fast onset probability, fastOnsetProb_1, associated with the low-frequency band signal based on the crest ratio 317 of that frequency band. The speech detector may for example determine a fast onset probability by setting variable fastOnsetProb:

fastOnsetProb=min(1,max(0,(crest−crestThldMin)/(crestThldMax−crestThldMin))); where typical values for crestThldMin lie between 1.5 and 3.5 and for crestThldMax lie between 1.8 and 4;

Also, the two following states, which are used in determination of the clean power msignal 313, are reset based on the determined crest factor 317:

```
if crest > crestPowEnvMaxDurFastOnsetRel
    cntAggrStnEstAttackTimeOut = cntAggrStnEstAttackTimeOutInit;
    powEnvAggrMinTracker = power envelope signal 301 (powEnv);
  end.
```

In step 510 the speech detector 10 preferably additionally determines corresponding high-frequency and/or mid-frequency fast onset probabilities using similar thresholding mechanisms as outlined above. According to the inventors' experimental data, the threshold value crestThldMin may lie between 1.5 and 3.5 and the value of threshold crestThldMax may lie between 1.8 and 4. The respective values of crestThldMin and crestThldMax may vary between the low-frequency, high-frequency and mid-frequency bands or may be substantially identical across these frequency bands. The specific threshold values may in some embodiments lie between 3 and 3.3 in the low-frequency band and 2.2 and 2.5 in the mid-frequency band and high-frequency band.

In response to a fast onset detection in one of the power envelope signals 301, the variable fastOnsetProb_1 of the low-frequency band, mid-frequency band or high-frequency band, as the case may be, is seta value of one (1). The fast onset may be flagged or categorized as a fast onset directly in response to the variable fastOnsetProb_1 is one or may alternatively be subjected to further tests before the fast onset is categorized as an onset of voiced speech in the incoming sound or as an onset of unvoiced speech in the incoming sound. The speech detector 10 may during processing step 520 for example categorize the fast onset as an impulse sound, as opposed to speech sound or component, if multiple fast onsets are detected concurrently in the low-frequency and high-frequency power envelope signals 301. Likewise, the speech detector 10 may in function or step 520 categorize the fast onset as an impulse sound, as opposed to speech sound or component, if the duration of each of the multiple fast onsets is less than a predetermined time period, or duration threshold, such as 0.05 s (50 ms). This is because it is a priori known that typical voiced speech components have longer duration than the duration threshold. If one or both of these criteria are fulfilled, the detected fast onset may safely be categorized as impulse sound or sounds and the speech detector 10 may accordingly decrease the value of the speech probability estimator 550 via the illustrated connection or wire 541.

In contrast, when the speech detector categorizes a particular fast onset as not an impulse sound, the speech detector 10 may categorize the fast onset as a voiced speech onset on the condition multiple fast onsets mainly are detected in the low-frequency power envelope signal 301 and increase the value of the speech probability estimator 550. The speech detector 10 may categorize the fast onset as a probable onset of unvoiced speech if the multiple fast onsets are mainly detected in the high-frequency power envelope signal and/or mainly detected in the mid-frequency power envelope signal and increase the value of the speech probability estimator 550.

As an alternative, or possibly additionally, criterion the speech detector 10 may categorize the fast onset as a voiced speech onset on the condition that the power or energy of the low-frequency clean power signal following the fast onset is significantly larger, e.g. at least 2 to 3 times larger, than the power or energy of the high-frequency clean power signal following the fast onset. The processing step or function 530 of the speech detector enables the speech detector 510 to make that determination by tracking or computing the respective maximum clean powers of the low-frequency, high-frequency and mid-frequency clean power signals 313 following a fast onset in any of the frequency bands. The speech detector 10 preferably exclusively increases the value of the speech probability estimator 550 if that latter criterion/condition is fulfilled.

In a similar manner, the speech detector 10 may categorize a fast onset in the high-frequency band signal as an unvoiced speech onset on the condition that the power or energy of the high-frequency clean power signal following the fast onset is significantly larger than the power or energy low-frequency clean power signal. Optionally in addition larger than the power or energy of the mid-frequency clean power signal, following the fast onset. The speech detector 10 preferably only increases the value of the speech probability estimator 550 via the illustrated connection or wire 542 in response to compliance with the latter criterion/condition.

If neither condition is fulfilled for the particular fast onset, the speech detector 10 preferably decreases the value of the speech probability estimator 550 via the illustrated input variable over wire 542. The output 32, of the speech detector 10, please refer to FIG. 1, may be configured to indicate or flag presence of speech in the incoming sound, i.e. speech=Y or speech=N at any particular time instant, by suitable adaptation of the speech probability estimator 550. The speech probability estimator 550 complies with a certain, or pre-set, speech criterion such as a value of the speech probability estimator exceeds a predetermined threshold. As schematically illustrated by FIG. 1, the DSP 8 may use the speech flag or signal 32 to adjust one or more parameters of one or several signal processing algorithm(s), for example the previously discussed environmental classifier algorithm, noise reduction algorithm, speech enhancement algorithm etc., executed on the portable communication device by the DSP 8.

Overall, the speech detector 10 is configured to increase or decrease the value of speech probability estimator 550 via the input connections 541, 542, 543 based on the respective indications of voiced speech onsets and unvoiced speech onsets derived from the low-frequency, high-frequency and mid-frequency power envelope signals 301. The skilled person will appreciate that the respective detections of the unvoiced speech onsets and voiced speech onsets in the respective frequency band signals can be viewed as analysis or monitoring of a modulation spectrum of speech of the incoming sound.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A method performed by a portable communication device, the method comprising:

generating a microphone signal by a microphone arrangement of the portable communication device based on incoming sound;

dividing the microphone signal into a plurality of separate frequency band signals comprising at least a first frequency band signal and a second frequency band signal;

determining a first power envelope signal of the first frequency band signal and a second power envelope signal of the second frequency band signal;

deriving a first stationary noise power signal and a first non-stationary noise power signal from the first power envelope signal;

deriving a first clean power signal by subtracting the first stationary noise power signal and the first non-stationary noise power signal from the first power envelope signal;

deriving a second stationary noise power signal and a second non-stationary noise power signal from the second power envelope signal;

deriving a second clean power signal by subtracting the second stationary noise power signal and the second non-stationary noise power signal from the second power envelope signal;

determining an onset of voiced speech that is associated with the first frequency band signal based on the first stationary noise power signal and the first clean power signal; and determining an onset of unvoiced speech that is associated with the second frequency band signal based on the second stationary noise power signal and the second clean power signal;

wherein the onset of voiced speech is determined by a speech detector, and wherein method further comprises outputting a speech flag or marker indicating speech by the speech detector, adjusting a signal processing parameter of the portable communication device based on the speech flag or the marker, and providing an acoustic signal for transmission into an ear canal of a user, wherein the acoustic signal is generated by the portable communication device based on the signal processing parameter.

2. The method of claim 1, wherein the onset of voiced speech is determined based on a first crest value representative of a relative power or energy between the first clean power signal and the first stationary noise power signal; and/or wherein the onset of unvoiced speech is determined based on a second crest value representative of a relative power or energy between the second clean power signal and second stationary noise power signal.

3. The method of claim 2, further comprising determining a first fast onset probability, fastOnsetProb_1, associated with the first frequency band signal by comparing the first crest value with a minimum threshold value and a maximum threshold value; and/or determining a second fast onset probability, fastOnsetProb_2, associated with the second frequency band signal by comparing the second crest value with the minimum threshold value and the maximum threshold value.

4. The method of claim 3, wherein the comparing the first crest value with the minimum threshold value and the maximum threshold value is in accordance with: fastOnsetProb_1=min(1, max(0, (crest−crestThldMin)/(crestThldMax−crestThldMin))); and/or wherein the comparing the second crest value with the minimum threshold value and the maximum threshold value is in accordance with: fastOnsetProb_2=min(1, max(0, (crest−crestThldMin)/(crestThldMax−crestThldMin))).

5. The method of claim 4, wherein a value of crestThldMin is between 1.5 and 3.5, and a value of crestThldMax is between 1.8 and 4.

6. The method of claim 3, further comprising:

detecting an occurrence of a fast onset associated with the first frequency band signal;

determining a duration of the fast onset in the first frequency band signal; and comparing the duration of the fast onset to a first duration threshold.

7. The method of claim 6, further comprising:

if the duration of the fast onset associated with the first frequency band signal exceeds the first duration threshold, categorizing the fast onset as a speech onset, and increasing a value of a speech probability estimate; and if the duration of the fast onset in the first frequency band signal does not exceed the first duration threshold, categorizing the fast onset as an impulse, and maintaining or decreasing the value of the speech probability estimate.

8. The method of claim 6, further comprising, if the fast onset associated with the first frequency band signal is categorized as the speech onset:

determining whether power of the first clean power signal following the fast onset satisfies a criterion;

if the power of the first clean power signal following the first onset satisfies the criterion, increasing a value of a speech probability estimate; and if the power of the first clean power signal following the first onset does not satisfy the criterion, maintaining or decreasing the value of the speech probability estimate.

9. The method of claim 1, wherein the first power envelope signal is determined by performing non-linear averaging of the first frequency band signal; and/or wherein the second power envelope signal is determined by performing non-linear averaging of the second frequency band signal.

10. The method of claim 1, wherein the first power envelope signal is determined by lowpass filtering the first frequency band signal using a first attack time and a first release time; and/or wherein the second power envelope signal is determined by lowpass filtering the second frequency band signal using a second attack time and a second release time.

11. The method of claim 10, wherein the first attack time is between 0 and 10 ms, and the first release time is between 20 ms and 100 ms; and/or wherein the second attack time is between 0 and 10 ms, and the second release time is between 20 ms and 100 ms.

12. The method of claim 1, further comprising determining whether there are multiple fast onsets concurrently in the first and second frequency band signals, or not; and if there are multiple fast onsets concurrently in the first and second frequency band signals, categorizing the fast onsets in the first and second frequency band signals as impulse sounds, and maintaining or decreasing a value of a speech probability estimate.

13. The method of claim 12, further comprising:

if there are no multiple fast onsets concurrently in the first and second frequency band signals, categorizing the fast onsets in the first and second frequency band signals as onsets of voiced speech and unvoiced speech, respectively, and increasing the value of the speech probability estimate.

14. The method of claim 1, further comprising:

determining a first point in time for an occurrence of a fast onset that is associated with the first frequency band signal;

determining a second point in time for an occurrence of a fast onset that is associated with the second frequency band signal;

determining a time difference between the first and second points in time;

comparing the time difference to a time threshold; and increasing a value of a speech probability estimate if the time difference is less than the time threshold, or maintaining or decreasing the value of the speech probability estimate if the time difference is not less than the time threshold.

15. The method of claim 1, further comprising tracking the first power envelope signal using:

a first envelope attack time when the first power envelope signal is larger than a threshold; and a first envelope release time when the first power envelope signal is smaller than or equal to the threshold.

16. The method of claim 15, wherein the first envelope attack time exceeds 500 ms and the first envelope release time is less than 50 ms.

17. The method of claim 1, further comprising:

tracking a difference between the first power envelope signal and the first stationary noise power signal using an attack time when the difference is larger than the first non-stationary noise power signal, and using a release time when the difference is smaller than or equal to the first non-stationary noise power signal.

18. The method of claim 1, further comprising limiting a maximum increase of the first non-stationary noise power signal to be smaller than, or equal to, a maximum of zero and an increase of a difference between the first power envelope signal and the first stationary noise power signal.

19. The method of claim 1, further comprising:

determining a first envelope difference based on the first stationary noise power signal and the first non-stationary noise power signal; and setting the first non-stationary noise power signal to zero when the first envelope difference is negative.

20. The method of claim 1, further comprising:

comparing a speech probability estimate to a predetermined speech criterion; and determining that there is speech in the incoming sound if the predetermined speech criterion is satisfied.

21. The method of claim 1 further comprising determining a value of a speech probability estimate based on the determined onset of voiced speech and the determined onset of unvoiced speech.

22. The method of claim 1 further comprising adjusting a value of a speech probability estimate based on the determined onset of voiced speech and the determined onset of unvoiced speech.

23. The method of claim 1, wherein the act of determining the onset of voiced speech is performed by an onset detector based on the first stationary noise power signal and the first clean power signal.

24. The method of claim 1, wherein the portable communication device comprises a hearing device.

25. A speech detector comprising:

an input configured to obtain a plurality of separate frequency band signals comprising at least a first frequency band signal and a second frequency band signal, the plurality of separate frequency band signals being based on microphone signal; and a processing unit configured to:

determine a first power envelope signal of the first frequency band signal and a second power envelope signal of the second frequency band signal;

derive a first stationary noise power signal and a first non-stationary noise power signal from the first power envelope signal;

derive a first clean power signal by subtracting the first stationary noise power signal and the first non-stationary noise power signal from the first power envelope signal;

derive a second stationary noise power signal and a second non-stationary noise power signal from the second power envelope signal; and derive a second clean power signal by subtracting the second stationary noise power signal and the second non-stationary noise power signal from the second power envelope signal;

determine an onset of voiced speech that is associated with the first frequency band signal based on the first stationary noise power signal and the first clean power signal; and determine an onset of unvoiced speech that is associated with the second frequency band signal based on the second stationary noise power signal and the second clean power signal;

wherein the speech detector is configured to provide a speech flag or marker indicating speech for a portable device, wherein the portable device is configured to adjust a signal processing parameter based on the speech flag or the marker, and to provide an acoustic signal for transmission into an ear canal of a user, wherein the portable device is configured to generate the acoustic signal based on the signal processing parameter.

26. A portable communication device comprising the speech detector of claim 25, wherein the portable communication device is the portable device.

27. The portable communication device of claim 26, wherein the portable communication device comprises a hearing device.

28. The speech detector of claim 25, wherein the processing unit of the speech detector comprises an onset detector configured to determine the onset of voiced speech based on the first stationary noise power signal and the first clean power signal.

* * * * *